United States Patent
Konishi

(10) Patent No.: US 12,261,443 B2
(45) Date of Patent: Mar. 25, 2025

(54) POWER MANAGEMENT SYSTEM, POWER MANAGEMENT METHOD, AND POWER MANAGEMENT PROGRAM

(71) Applicant: IHI Corporation, Tokyo (JP)

(72) Inventor: Misako Konishi, Tokyo (JP)

(73) Assignee: IHI Corporation, Tokyo (JP)

(*) Notice: Subject to any disclaimer, the term of this patent is extended or adjusted under 35 U.S.C. 154(b) by 0 days.

(21) Appl. No.: 18/561,410

(22) PCT Filed: Jun. 30, 2022

(86) PCT No.: PCT/JP2022/026371
§ 371 (c)(1),
(2) Date: Nov. 16, 2023

(87) PCT Pub. No.: WO2023/277162
PCT Pub. Date: Jan. 5, 2023

(65) Prior Publication Data
US 2024/0235208 A1 Jul. 11, 2024

(30) Foreign Application Priority Data
Jul. 2, 2021 (JP) ................. 2021-110942

(51) Int. Cl.
*H02J 3/38* (2006.01)
*H02J 3/00* (2006.01)
*H02J 3/12* (2006.01)
*H02S 50/00* (2014.01)
*H02J 3/32* (2006.01)
*H02J 7/35* (2006.01)

(52) U.S. Cl.
CPC ............... *H02J 3/38* (2013.01); *H02J 3/004* (2020.01); *H02J 3/12* (2013.01); *H02S 50/00* (2013.01); *H02J 3/32* (2013.01); *H02J 7/35* (2013.01); *H02J 2300/24* (2020.01)

(58) Field of Classification Search
CPC ...... H02J 3/38; H02J 3/004; H02J 3/12; H02J 2300/24; H02J 3/32; H02J 7/35; H02J 3/00; H02S 50/00
See application file for complete search history.

(56) References Cited

U.S. PATENT DOCUMENTS

2022/0209539 A1  6/2022  Takai et al.

FOREIGN PATENT DOCUMENTS

| JP | 2014-117003 A | 6/2014 |
| JP | 2016-126983 A | 7/2016 |
| JP | 6852621 B2 | 3/2021 |
| WO | 2020/203993 A1 | 10/2020 |

*Primary Examiner* — Robert L Deberadinis

(57) ABSTRACT

A power management system that controls a power generation facility including a photovoltaic power generation device, the power management system including: a control unit that controls load power based on a predicted generated power assuming that the generated power by the power generation facility is the predicted generated power based on a power generation capacity of the power generation facility; and an actual power generation amount information acquisition unit serving as a power generation information acquisition unit that acquires actual generated power generated by the power generation facility. The control unit temporarily changes the control method when detecting that the difference between the predicted generated power and the actual generated power is larger than a predetermined value.

8 Claims, 4 Drawing Sheets

POWER MANAGEMENT SYSTEM, POWER MANAGEMENT METHOD, AND POWER MANAGEMENT PROGRAM

CROSS REFERENCE TO RELATED APPLICATIONS

This patent application is a U.S. national stage application under 35 U.S.C. § 371 of International Patent Application No. PCT/JP2022/026371 filed on Jun. 30, 2022, which claims the benefit of foreign priority to Japanese Patent Application No. JP 2021-110942 filed on Jul. 2, 2021. The International Application was published in Japanese on Jan. 5, 2023, as International Publication No. WO 2023/277162 A1 under PCT Article 21(2).

TECHNICAL FIELD

The present disclosure relates to a power management system, a power management method, and a power management program.

BACKGROUND ART

Patent Literature 1 discloses, as a system for performing power management in a microgrid, a configuration in which the power expected to be output by a power generation facility is output as an expected generated power, and the load power is adjusted on the basis of the expected generated power.

CITATION LIST

Patent Literature

Patent Literature 1: WO 2020/203993 A

SUMMARY OF INVENTION

Technical Problem

Since power generation facilities such as photovoltaic power generation are mostly installed outdoors, a state in which the generated power in the power generation facilities deviates from expected generated power may occur due to some circumstances different from failure. In such a case, in the method described in Patent Literature 1, although the power generation operation is continued, there is a possibility that a balance between the generated power and the load power cannot be appropriately managed.

The present disclosure has been made in view of the above, and a description will be given of providing a technique capable of performing power management in consideration of a fluctuation in a case where actual generated power in a power generation facility fluctuates from that of an assumed state.

Solution to Problem

In order to achieve the above object, a power management system according to an aspect of the present disclosure is a power management system that controls a power generation facility including a photovoltaic power generation device, the power management system including: a control unit that controls the power generation facility on the basis of a predicted generated power, assuming that the generated power by the power generation facility is predicted generated power based on a power generation capacity of the power generation facility, and a power generation information acquisition unit that acquires an actual generated power generated by the power generation facility, in which the control unit temporarily changes the method of controlling the power generation facility, when detecting that a difference between the predicted generated power and the actual generated power is larger than a predetermined value.

Advantageous Effects of Invention

According to the present disclosure, there is provided a technology capable of performing power management in consideration of a fluctuation in a case where actual generated power in a power generation facility fluctuates from that of an assumed state.

DESCRIPTION OF EMBODIMENTS

Figure 1:
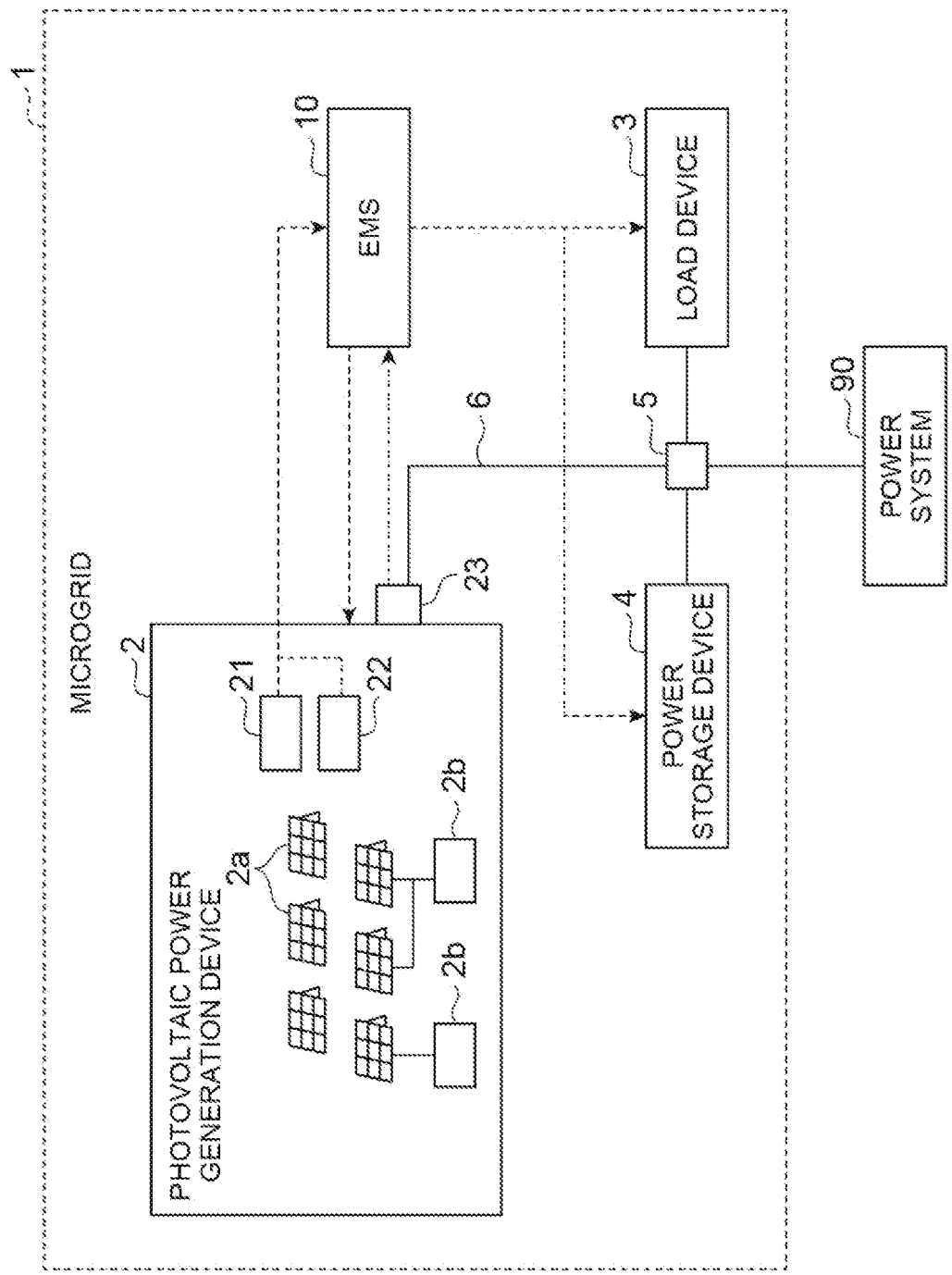
FIG. 1 is a diagram schematically illustrating a configuration of a microgrid according to one embodiment.

A power management system according to an aspect of the present disclosure is a power management system that controls a power generation facility including a photovoltaic power generation device, the power management system including: a control unit that controls the power generation facility on the basis of a predicted generated power, assuming that the generated power by the power generation facility is predicted generated power based on a power generation capacity of the power generation facility, and a power generation information acquisition unit that acquires an actual generated power generated by the power generation facility, in which the control unit temporarily changes the method of controlling the power generation facility, when detecting that a difference between the predicted generated power and the actual generated power is larger than a predetermined value.

In addition, a power management method according to an aspect of the present disclosure is a power management method for controlling a power generation facility including a photovoltaic power generation device, the method including: controlling the power generation facility on the basis of a predicted generated power assuming that the generated power by the power generation facility is predicted generated power based on a power generation capacity of the power generation facility; and acquiring actual generated power generated by the power generation facility, in which in the controlling, when it is detected that a difference between the predicted generated power and the actual generated power is larger than a predetermined value, a method of controlling the power generation facility is temporarily changed.

In addition, a power management program according to an aspect of the present disclosure is a power management program for causing a computer to control a power generation facility including a photovoltaic power generation device, the power management program causing the computer to execute: controlling the power generation facility on the basis of a predicted generated power assuming that the generated power by the power generation facility is the predicted generated power based on a power generation capacity of the power generation facility; and acquiring actual generated power generated by the power generation facility, in which in the controlling, when it is detected that a difference between the predicted generated power and the actual generated power is larger than a predetermined value, a method of controlling the power generation facility is temporarily changed.

According to the power management system, the power management method, and the power management program, when it is detected that the difference between the predicted generated power and the actual generated power is larger than a predetermined value, the control unit temporarily changes the method of controlling the power generation facility. Therefore, when the actual generated power generated by the power generation facility deviates from the predicted generated power, it is possible to prevent the control in which the generated power by the power generation facility is assumed to be the predicted generated power from being continued. In addition, by temporarily changing the above control method, it is possible to prevent occurrence of a problem due to long-term continuation of the change of the control method.

The control unit may temporarily change the generated power by the power generation facility, which is a reference in the control of the load power consumed by the load device connected to the power generation facility, from the predicted generated power to the actual generated power when detecting that the difference is larger than a predetermined value.

As described above, when it is detected that the difference between the predicted generated power and the actual generated power is larger than the predetermined value, the control unit changes the generated power by the power generation facility serving as a reference in the control of the load power from the predicted generated power to the actual generated power, whereby the control according to the fluctuation of the actual generated power can be performed. That is, when the actual generated power in the power generation facility fluctuates from that of the assumed state, it is possible to perform power management in consideration of the fluctuation.

The control unit may change the generated power by the power generation facility serving as a reference in the control of the load power from the actual generated power to the predicted generated power when the difference becomes smaller than a predetermined value.

When the difference is smaller than the predetermined value, the control is returned to the control based on the predicted generated power. Therefore, when the control based on the actual generated power becomes unnecessary, the control can be quickly returned to the control based on the predicted generated power.

The control unit may change the generated power by the power generation facility serving as a reference in the control of the load power from the actual generated power to the predicted generated power when the difference is expected to be small.

In a case where the difference is expected to be small, the control is returned to the control based on the predicted generated power. Therefore, in a case where the control based on the actual generated power becomes unnecessary, the control can be quickly returned to the control based on the predicted generated power.

The control unit may temporarily change the generated power by the power generation facility serving as a reference in the control of the load power consumed by the load device connected to the power generation facility from the predicted generated power to the actual generated power in a case where it is detected that the difference is larger than a predetermined value and an operation causing the difference to be large is not performed in the power generation facility.

As a cause of an increase in the difference between the predicted generated power and the actual generated power, there may be a case where a control operation in a range of a normal operation such as forced stop of a part of facilities for the purpose of adjustment of the generated power or the like is caused instead of some change in a power generation capacity of the power generation facility. On the other hand, as described above, it is possible to prevent the change triggered by the occurrence of the difference derived from the normal operation, for example, by confirming that the operation causing the increase in the difference between the predicted generated power and the actual generated power is not performed in the power generation facility and then changing the control to control in which the actual generated power is used as the generated power by the power generation facility.

The control unit may temporarily change the generated power by the power generation facility serving as a reference in the control of the load power consumed by the load device connected to the power generation facility from the predicted generated power to the actual generated power in a case where it is detected that the difference is larger than a predetermined value and an event causing the actual generated power to decrease occurs.

As a cause of an increase in the difference between the predicted generated power and the actual generated power, instead of occurrence of an event that causes a decrease in the power generation capacity in the power generation facility, another event such as a failure in the power generation facility or a peripheral device thereof may occur. On the other hand, as described above, the control is changed to the control in which the actual generated power is used as the generated power by the power generation facility after the occurrence of the event causing the decrease of the actual generated power in the power generation facility is confirmed, so that it is possible to prevent the change triggered by the occurrence of the abnormality derived from the failure or the like.

A detection unit that detects presence or absence of an obstacle on a light receiving surface of a solar panel included in the photovoltaic power generation device may be further included, and the control unit may determine that an event causing the actual generated power to decrease has occurred when the detection unit detects the obstacle on the light receiving surface.

As an event that causes a decrease in power generation capacity in a power generation facility, occurrence of an obstacle that blocks a part of a light receiving surface of a solar panel, such as snow cover, can be assumed. Therefore, as described above, with a configuration to determine that an event that causes a decrease in the actual generated power has occurred when the detection unit that detects the presence or absence of the obstacle on the light receiving surface of the solar panel detects the obstacle, the control unit can reliably determine the event occurring in the photovoltaic power generation device. In addition, based on this result, the control unit may appropriately make a temporary change to the control based on the actual generated power.

Hereinafter, embodiments according to the present disclosure will be described in detail with reference to the accompanying drawings. In the description of the drawings, the same elements are denoted by the same reference numerals, and redundant description will be omitted.

[Microgrid]

A power management system (hereinafter, also referred to as "energy management system" (EMS)), a power management method, and a power management program according to the present embodiment are used for a microgrid.

The microgrid will be described with reference to FIG. 1. FIG. 1 is a diagram schematically illustrating a configuration of the microgrid according to one embodiment. The microgrid 1 includes a power generation facility 2, a load device 3, a power storage device 4, a power adjustment device 5, a power transmission grid 6 that connects these devices, and an EMS 10 (power management system) that controls these devices. In the microgrid 1, the load device 3 consumes a generated power output from the power generation facility 2.

Ideally, the microgrid 1 is operated such that the generated power generated from the power generation facility 2 is equal to a load power consumed by the load device 3. That is, the EMS 10 adjusts the generated power and the load power. The EMS 10 basically adjusts the generated power and the load power so that the generated power does not exceed the load power. In addition, the EMS 10 may adjust charging and discharging of a storage battery in the power storage device 4 as a buffer between the generated power and the load power. In the following embodiment, "control of load power" will be described, but the control target in this case includes at least load power consumed by the load device 3. In addition, since the storage battery in the power storage device 4 can also be changed in conjunction with the load power as described above, charging and discharging of the storage battery described above may be included as a control target.

The microgrid 1 may be connected to the power system 90 as necessary. In this case, insufficient power can be received from the power system 90. On the other hand, an outflow of power from the microgrid 1 to the power system 90 (so-called reverse power flow) affects a balance between a demand and supply of power in the power system 90. Therefore, in the microgrid managed by the EMS 10 according to the present embodiment, a reverse power flow is basically not generated.

Note that an operation mode of the microgrid 1 may be flexibly changed. The microgrid 1 may receive the required power all covered by the power generation facility 2, or may receive a part of the required power from the power system 90. Further, in the microgrid 1, all the power generated in the microgrid 1 may be consumed by the load device 3.

The power generation facility 2 is a facility that generates power using renewable energy. In the present embodiment, the power generation facility 2 is a photovoltaic (PV) power generation device, and includes a plurality of solar panels 2a and a plurality of power conditioning systems (PCS 2b). The power generation facility 2 can include at least a photovoltaic power generation device, but may be configured in combination with another type of renewable energy power generator. FIG. 1 illustrates two PCSs 2b used in a photovoltaic power generation device as an example. The PCS 2b is a power conversion device that converts power generated by the solar panel 2a. A plurality of PCSs 2b may be provided in the power generation facility 2 and connected to one or more solar panels 2a. The PCS 2b converts DC power from the solar panel 2a into AC power and outputs the AC power to the power transmission grid 6.

In the power generation facility 2, the amount of power generation may fluctuate by controlling the number of PCSs 2b to be operated to change the number of solar panels 2a. When all the plurality of PCSs 2b included in the power generation facility 2 are operated, the power generation amount (power transmission amount in the power transmission grid 6) by the solar panel 2a connected to the PCS 2b is maximized. On the other hand, when the operation of some of the PCSs 2b is stopped, the power generated in the solar panel 2a is not transmitted to the power transmission grid 6, and thus the power generation amount as the power generation facility 2 decreases. In addition, it may take a certain period of time (for example, about several tens of seconds to several minutes) from the activation of the PCS 2b until the amount of power transmission (power) to the power transmission grid 6 becomes a state corresponding to the actual capability. This is an event that can be assumed in the power generation facility 2 in which the PCS 2b is used.

The power generation facility 2 may be provided with a power generation capacity index calculation unit 21 that calculates an index related to the power generation capacity of the power generation facility 2 and a panel monitoring unit 22 that monitors the state of the solar panel 2a of the power generation facility 2.

The power generation capacity index calculation unit 21 has a function of predicting a power generation amount in the power generation facility 2 and calculating the power generation amount as an index. The predicted power generation amount (predicted generated power) is obtained by predicting the power generation amount of the power generation facility 2 that may fluctuate depending on weather conditions or the like. For example, in a case where each solar panel 2a can operate normally, the weather is good, and the amount of sunlight irradiated to the solar panel 2a is sufficient, power generation equivalent to a maximum power generation amount assumed in the power generation facility 2 can be performed. Therefore, in the case of such conditions, the predicted power generation amount increases, but in a case where the power generation amount is not the maximum due to the amount of sunlight irradiated to the solar panel 2a as in the case of cloudy weather, the maximum power generation amount cannot be realized, and the predicted power generation amount may be a predicted generated power according to the amount of sunlight. As described above, the power generation amount in the power generation facility 2 may fluctuate mainly according to the weather conditions. The power generation capacity index calculation unit 21 may be configured to calculate an expected power generation amount on the assumption that all the PCSs 2b are operating and output the calculated power generation amount to the EMS 10 as a power generation capacity index.

For example, the power generation capacity index calculation unit 21 may prepare a sample panel simulating the solar panel 2a, and calculate the power generation capacity index based on the power generation amount in the sample panel. In addition, a light amount of sunlight may be detected using a light sensor, and an amount of power that can be generated may be calculated on the basis of the light amount to be used as a power generation capacity index. In addition, the power generation capacity index calculation unit 21 may be configured by combining some of such methods. Although FIG. 1 illustrates an example in which the power generation capacity index calculation unit 21 is provided in the power generation facility 2, a part of the function as the power generation capacity index calculation unit 21 may be provided in, for example, the EMS 10. For example, the parameter (for example, acquisition of information on the light amount of sunlight) necessary for the calculation of the power generation capacity index may be performed in or around the power generation facility 2, and the calculation of the actual capacity index may be performed by the EMS 10.

Note that, in a case where a part of the PCS 2b in the power generation facility 2 is not operating, even if the solar panel 2a is irradiated with sunlight, power is not transmitted by the PCS 2b, and thus, it cannot be included as the power generation amount in the power generation facility 2. Therefore, the power generation capacity index calculation unit 21 may be configured to predict the predicted generated power in the power generation facility 2 in the future based on an operation status of the PCS 2b and the like. In a case where the predicted generated power is calculated on the basis of the operation status of the PCS 2b, the predicted generated power corresponding to the PCS 2b in operation is obtained by multiplying the power generation capacity index (corresponding to a total number of PCSs 2b) by the ratio of a number of PCSs 2b in operation to the total number of PCSs 2b.

However, in the present embodiment, the description will be given on the assumption that the power generation capacity index calculated by the power generation capacity index calculation unit 21 is obtained by calculating the predicted generated power on the assumption that all the PCSs 2b are operating. That is, the "power generation capacity index" described below is treated as the predicted generated power calculated on the condition that all the PCS 2b are operating.

The panel monitoring unit 22 monitors the situation of the solar panel 2a, and particularly monitors the presence or absence of an obstacle on the light receiving surface of the solar panel 2a. For example, in a case where a part of the light receiving surface of the solar panel 2a is covered with an object capable of blocking light such as defoliation or snow, even in a case where sunlight is sufficiently irradiated toward the solar panel 2a, an amount of received light in the solar panel 2a decreases, and as a result, the amount of power generation may decrease. As described above, the panel monitoring unit 22 has a function of monitoring the presence or absence of an event that may interfere with the irradiation of the solar panel 2a with sunlight, and particularly monitoring the presence or absence of an obstacle. As a monitoring method, for example, the light receiving surface of the solar panel 2a may be imaged by a camera. In addition, a sensor capable of detecting the same type of state when snow cover, defoliation, or the like occurs on the solar panel 2a may be used, and for example, a snowfall sensor or the like may be used. For example, a sample panel similar to the solar panel 2a may be prepared, and the presence or absence of an obstacle blocking a part of the surface of the sample panel may be determined as the presence or absence of an obstacle with respect to the solar panel 2a. Note that the panel monitoring unit 22 may be configured to operate constantly, or may be configured to perform monitoring in accordance with an instruction from the EMS 10, for example.

Further, the power generation facility 2 is provided with an actual power generation amount measurement unit 23 for measuring an actual power generation amount in the power generation facility 2. The actual power generation amount measurement unit 23 may be configured to measure the actual power generation amount in the power generation facility 2 by measuring the power output from the power generation facility 2 to the power transmission grid 6. However, the method of measuring the actual power generation amount is not limited to the above method.

The load device 3 is connected to the power generation facility 2, the power storage device 4, and the power system 90 via the power transmission grid 6. The load device 3 consumes the generated power from the power generation facility 2 and the supply power from the power system 90 to perform a desired operation. Note that the load device 3 may be configured to operate in cooperation with a load device or the like provided outside the microgrid 1.

The power storage device 4 stores energy associated with power generated by the power generation facility 2. In the present embodiment, the power storage device 4 charges and discharges power generated by the power generation facility 2. For example, the power storage device 4 outputs a certain amount of output power to the load device 3. The microgrid 1 may include, instead of the power storage device 4, a device that stores or supplies the generated power generated by the power generation facility 2 by manufacturing energy carriers (for example, hydrogen, ammonia, or the like) other than electricity.

The power adjustment device 5 is connected to, for example, the power generation facility 2, the load device 3, the power storage device 4, and the power system 90, and outputs predetermined power obtained by combining the generated power from the power generation facility 2, the output power from the power storage device 4, and the supply power from the power system 90 to the load device 3 under the control of the EMS 10. For example, the power adjustment device 5 outputs a certain amount of output power output from the power storage device 4 and a part of generated power by the power generation facility 2 to the load device 3. A part of the generated power output from the power adjustment device 5 to the load device 3 is power corresponding to a shortage of the output power from the power storage device 4 with respect to the load power. When only the generated power from the power generation facility 2 and the output power from the power storage device 4 are less than the load power, the power adjustment device 5 may compensate for the shortage with the supply power purchased from the power system 90. The power adjustment device 5 may always output power supplied from the power system 90 to the load device 3. The operation related to the distribution of power by the power adjustment device 5 is performed under the control of the EMS 10 as described above.

[EMS]

Figure 2:
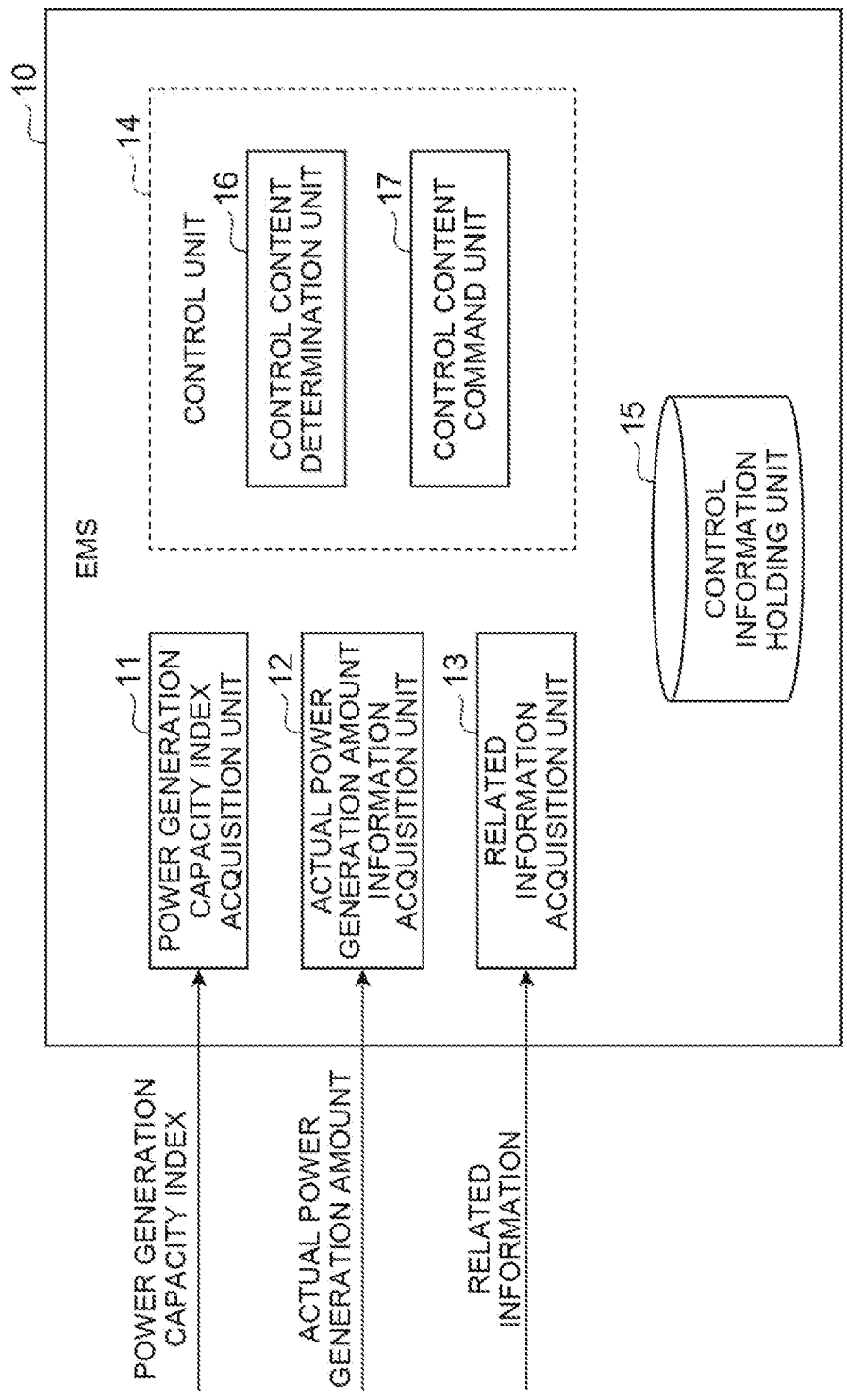
FIG. 2 is a diagram illustrating a functional configuration of an EMS.

The EMS 10 manages generated power by the power generation facility 2, load power by the load device 3, output power by the power storage device 4, and supply power from the power system 90. FIG. 2 is a diagram illustrating a functional configuration of the EMS. The EMS 10 controls the power generation facility 2, the load device 3, the power storage device 4, and the power adjustment device 5. The EMS 10 controls the PCS 2b in the power generation facility 2.

As illustrated in FIG. 2, the EMS 10 includes a power generation capacity index acquisition unit 11, an actual power generation amount information acquisition unit 12 (power generation information acquisition unit), a related information acquisition unit 13, a control unit 14, and a control information holding unit 15 as functional units. The control unit 14 includes a control content determination unit 16 and a control content command unit 17. Note that these functional units may be integrated into one computer or may be distributed to a plurality of computers.

The power generation capacity index acquisition unit 11 has a function of acquiring the power generation capacity index calculated by the power generation capacity index calculation unit 21. The power generation capacity index acquisition unit 11 acquires the power generation capacity index from the power generation capacity index calculation unit 21, for example, at predetermined intervals. The acquired power generation capacity index is used in the control content determination unit 16 in the control unit 14. As described above, in a case where the power generation capacity index is calculated by the EMS 10 instead of the power generation capacity index calculation unit 21, for example, the power generation capacity index acquisition unit 11 may acquire information necessary for calculating the power generation capacity index (such as information on the amount of sunlight), and the power generation capacity index acquisition unit 11 may calculate the power generation capacity index.

The actual power generation amount information acquisition unit 12 has a function of acquiring an actual power generation amount measured by the actual power generation amount measurement unit 23. The actual power generation amount information acquisition unit 12 acquires the actual power generation amount from the actual power generation amount measurement unit 23, for example, at predetermined intervals. The acquired actual power generation amount is used in the control content determination unit 16 in the control unit 14.

The related information acquisition unit 13 has a function of acquiring information (related information) that may affect the determination of the control content in the control content determination unit 16 of the control unit 14. Although details will be described below, the control unit 14 may change the method of calculating the load power in the load device 3 as the control content in consideration of the difference between the power generation capacity index and the actual power generation amount. At that time, whether to change the load power calculation method in the load device 3 may be determined using the related information acquired by the related information acquisition unit 13. The related information used at this time is information indicating the presence or absence of a cause for which the actual power generation amount may fluctuate, and as an example, is a monitoring result regarding the situation of the light receiving surface of the solar panel 2a by the panel monitoring unit 22. As another example, weather information around the microgrid 1 (in particular, the power generation facility 2) may be used as the related information. These pieces of information are used to confirm whether an event contributing to the change in the power generation capacity of the power generation facility 2 occurs when the actual power generation amount in the power generation facility 2 deviates from the predicted generated power based on the power generation capacity index.

The control unit 14 may determine a power operation policy in the microgrid 1 based on the information acquired by the power generation capacity index acquisition unit 11, the actual power generation amount information acquisition unit 12, and the related information acquisition unit 13, and determine a control content of each unit of the microgrid 1. In addition, the control unit 14 may control each unit of the microgrid 1 on the basis of the determined control content.

The control content determination unit 16 has a function of deciding control contents of each unit of the microgrid 1. Specifically, the control content determination unit 16 determines the load power in the load device 3 according to the generated power in the power generation facility 2. Then, output power from the power storage device 4 and supply power from the power system 90 are determined. When the control content determination unit 16 decides the control contents, information other than the information acquired by the power generation capacity index acquisition unit 11, the actual power generation amount information acquisition unit 12, and the related information acquisition unit 13 may also be used.

The control content command unit 17 has a function of issuing a command to each unit of the microgrid 1 based on the control content determined by the control content determination unit 16 to control each unit. Specifically, commands can be issued to the power generation facility 2, the load device 3, and the power adjustment device 5 to control each unit.

The control information holding unit 15 has a function of holding various types of information used for the above control. For example, logic or the like for determining the control content in the control content determination unit 16 may be held in the control information holding unit 15. The control information holding unit 15 may hold the determined control content for a predetermined time. Further, the control information holding unit 15 may have a function of holding information acquired by the power generation capacity index acquisition unit 11, the actual power generation amount information acquisition unit 12, and the related information acquisition unit 13.

[Power Management Method]

Figure 3:
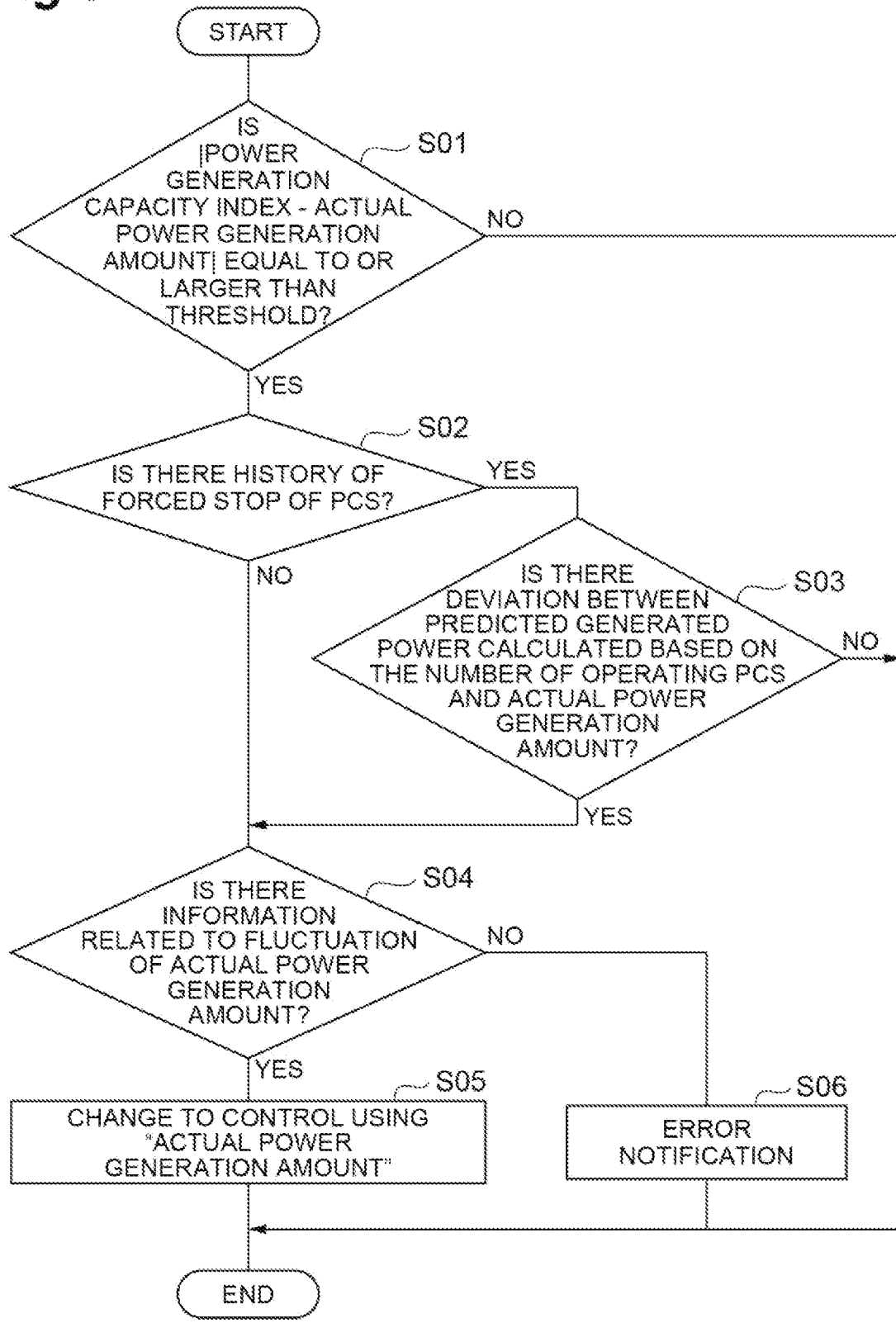
FIG. 3 is a flowchart for explaining a power management method.

A power management method by the EMS 10 will be described with reference to FIG. 3. FIG. 3 is a flowchart illustrating the power management method.

As a premise, in the EMS 10, during the normal operation, the load power in the load device 3 is calculated based on the power generation capacity index calculated by the power generation capacity index calculation unit 21, and each unit of the microgrid 1 is controlled. The control unit 14 of the EMS 10 adjusts the load power in the load device 3 so that the generated power can be utilized on the assumption that the power of the power generation amount indicated by the power generation capacity index acquired by the power generation capacity index acquisition unit 11 is transmitted from the power generation facility 2 to the power transmission grid 6.

On the other hand, in the EMS 10, the actual power generation amount measurement unit 23 measures the power actually transmitted from the power generation facility 2 to the power transmission grid 6, and the actual power generation amount information acquisition unit 12 acquires the result. With such a configuration, the EMS 10 may grasp that the deviation between the power generation capacity index and the actual power generation amount occurs. Therefore, the EMS 10 periodically (for example, every several minutes to several hours) evaluates a difference between the power generation capacity index and the actual power generation amount. As described above, the flowchart illustrated in FIG. 3 illustrates an operation procedure of the EMS 10 in a case where the EMS 10 performs control based on the power generation capacity index and monitors the difference between the power generation capacity index and the actual power generation amount during the normal operation.

First, the control content determination unit 16 of the EMS 10 determines whether a difference between the power generation capacity index and the actual power generation amount (actual power generation amount) is equal to or larger than a threshold (step S01). The threshold can be set to be sufficiently larger than a difference that may occur during normal operation. Even during the normal operation, there may be a time when the difference between the power generation capacity index and the actual power generation amount increases due to operation setting of each unit or the like. The threshold may be set in consideration of such power fluctuation occurring at the normal time.

As a result of the determination, when the difference between the power generation capacity index and the actual power generation amount (actual power generation amount) is less than the threshold (S01—NO), the control content determination unit 16 of the EMS 10 determines to continue the normal operation and continues the control. On the other hand, when the difference between the power generation capacity index and the actual power generation amount (actual power generation amount) is equal to or larger than the threshold (S01—YES), the control content determination unit 16 checks whether there is a history of forced stop of the operation of the PCS 2b included in the power generation facility 2 as a cause for the difference between the power generation capacity index and the actual power generation amount being equal to or larger than the threshold (step S02).

The forced stop of the operation of the PCS 2b as a determination criterion in step S02 is a control content that can occur even during the normal operation of the microgrid 1. As an example, in a case where a reverse power flow from the microgrid 1 to the power system 90 may occur due to the small load power by the load device 3, the EMS 10 may suppress the power generation amount by forcibly stopping the PCS 2b in the power generation facility 2 in order to prevent the reverse power flow. When the PCS 2b is stopped, a deviation from the power generation capacity index in which all the PCS 2b are assumed to operate inevitably occurs. The forced stop of the PCS 2b for suppressing the reverse power flow can be canceled when there is no possibility of the reverse power flow (the PCS 2b can be restarted). The forced stop and the restart may be repeated from the viewpoint of the presence or absence of the possibility of the reverse power flow. Therefore, the forced stop of the PCS 2b may be repeatedly performed in a short period of time, or the state of the forced stop may be continued for a certain period of time.

In addition, when the PCS 2b is to be activated from the stopped state, a certain period of time (for example, about several tens of seconds to several minutes) is required until the power transmission amount (power) returns to the state corresponding to the actual capability as described above. As described above, the presence of the history of the forced stop of the operation of the PCS 2b included in the power generation facility 2 is considered to be a possibility of a decrease in the amount of power generation derived from the forced stop of the PCS 2b. Therefore, in step S02, by determining the presence or absence of the history described above, it is determined whether or not the difference is derived from the control during the normal operation by the EMS 10.

In the microgrid 1, basically, it is not assumed that the PCS 2b of the power generation facility 2 is stopped for a long period of time, and even if the PCS 2b is stopped, control is performed to restart the PCS 2b in a short period of time (about several minutes to several tens of minutes). Therefore, the period for determining the presence or absence of the history of the forced stop is longer than a certain time (for example, several minutes) required for returning from the activation of the PCS 2b. In addition, the upper limit may be the duration of the stop of the PCS 2b that can be assumed in the normal operation on the microgrid 1. When there is no history of forced stop of any one of the PCSs 2b of the power generation facility 2 by control by the EMS 10 or manual operation within the determination target time set under the above conditions, it is determined that there is no history of forced stop of the operation of the PCS 2b included in the power generation facility 2 (S02—NO).

On the other hand, when it is determined that there is a history that any one of the PCSs 2b of the power generation facility 2 is forcibly stopped by control by the EMS 10 or manual operation (S02—YES), it is determined whether there is a deviation between the predicted generated power calculated based on the number of operating PCSs 2b and the actual power generation amount (step S03). If the stop is continued after the forced stop, or if there is a PCS 2b that has been started but has not returned to the operating state, it is not possible to generate power corresponding to the power generation capacity index, thus it is obvious that there is a deviation between the power generation capacity index and the actual power generation amount. Therefore, the "power generation capacity index×(the number of PCS to be operated/the total number of PCSs)" is calculated using the number of operating PCSs 2b, thereby calculating the predicted generated power when all the PCSs 2b actually operating exhibit the power generation capacity without any problem. Then, it is determined whether there is a deviation between the predicted generated power and the actual power generation amount in the power generation facility 2. When the presence or absence of the deviation is determined, a threshold may be set as in step SOI. As a result of the determination, when it is determined that there is no deviation (S03—NO), the control during the normal operation is continued without changing the control content or the like. On the other hand, in a case where it is determined that there is a deviation (S03—YES), similarly to a case where it is determined that there is no history of forced stop (S02—NO), it is determined whether or not an event affecting power generation has occurred in the solar panel 2a.

Specifically, based on the related information acquired by the related information acquisition unit 13, it is determined whether there is information on an event that affects the actual power generation amount (step S04). Specifically, the determination is made based on whether information indicating a state in which sunlight cannot be appropriately received on the light receiving surface of the solar panel 2a is included in the monitoring result regarding the situation of the light receiving surface of the solar panel 2a by the panel monitoring unit 22, weather information (information regarding snow cover), and the like acquired by the related information acquisition unit 13. As a result of this determination, when it is determined that there is information on an event affecting the actual power generation amount (S04—YES), the control content determination unit 16 of the EMS 10 determines that it is a situation where power generation corresponding to the power generation capacity index cannot be performed due to the event affecting the actual power generation amount. Therefore, the control content determination unit 16 changes the method using the power generation capacity index to the method using the actual power generation amount as a method of determining the load power in the load device 3 by the EMS 10 (step S05). As a result, the load power is calculated based on the actual power generation amount, and a command to each unit for controlling the load power in the load device 3 is issued from the control content command unit 17.

When the control of the load power based on the actual power generation amount is started, the EMS 10 may monitor the number of operating PCSs 2b. When a difference occurs between the power generation capacity index and the actual power generation amount during the normal operation, the EMS 10 performs an operation of activating the PCS 2b being stopped by increasing the load power in the load device 3. On the other hand, when the control of the load power based on the actual power generation amount is started as described above, it is assumed that the comparison with the power generation capacity index cannot be performed, so that there is no opportunity to perform the control to start the PCS 2b being stopped. Therefore, the EMS 10 may monitor the number of PCSs 2b to be operated, and may perform control to increase the load power in the load device 3 so that the PCS 2b is activated when there is the PCS 2b whose stop state is continued.

On the other hand, as a result of the determination, when it is determined that there is no information on the event that affects the actual power generation amount (S04—NO), it is determined that the power generation corresponding to the power generation capacity index cannot be performed due to a cause different from the event that affects the actual power generation amount such as snowfall. As a result, the control content determination unit 16 of the EMS 10 determines not to change the control content itself from the control content during the normal operation. However, in order to notify the administrator or the like of the EMS 10 of the possibility that a certain problem has occurred, an error notification is output (step S06). As a cause that the power generation corresponding to the power generation capacity index cannot be performed, for example, a failure of a device in a portion not related to an event such as snow cover or defoliation can be considered. In this case, repair, replacement, and the like of the failed portion are required. It is also conceivable that the long-term use of the solar panel 2a or the PCS 2b of the power generation facility 2 reduces the power generation capacity in normal times. In this case, it is required to correct the power generation capacity index itself in accordance with the substantial power generation capacity of the power generation facility 2. In either case, the administrator or the like is notified of any problem by error notification.

When the method of determining the load power in the load device 3 by the EMS 10 is changed to the method using the actual power generation amount (step S05), the method of determining the load power is returned to the method using the original power generation capacity index at some timing. The control unit 14 (the control content determination unit 16 and the control content command unit 17) of the EMS 10 also performs control related to changing the load power determination method to a method using the power generation capacity index. A method of setting the timing at which the EMS 10 returns the load power determination method to the method using the power generation capacity index is not particularly limited. As an example, the control unit 14 of the EMS 10 may monitor the difference between the power generation capacity index (predicted generated power calculated according to the number of operating PCSs 2b when stopped PCS 2b exists) and the actual power generation amount, and return to the method using the power generation capacity index when the difference falls within the threshold.

In addition, as a result of the monitoring by the panel monitoring unit 22 acquired by the related information acquisition unit 13, when information that can be determined that an obstacle such as snow cover has been removed from the light receiving surface of the solar panel 2a is obtained, this may be used as a trigger for the change.

Specifically, when it can be confirmed that snow does not exist in the image captured by the camera, it is conceivable to use this as a trigger for the control change. This information can be said to be information for specifying that an obstacle related to power generation in the solar panel 2a has been removed. In addition, when information from which it can be determined that the snowfall has melted is obtained from the information of the snowfall sensor, it is conceivable to use this information as a trigger for the control change. Furthermore, for example, in a case where it can be determined that snow has melted on the basis of weather information or the like, acquisition of this information can be used as a trigger for change to control based on the power generation capacity index. These pieces of information can be regarded as information from which removal of an obstacle is expected. Alternatively, it can be said that it is information in which removal of an obstacle is expected.

In addition, it is also conceivable to use a method of changing the method of determining the load power to the method using the actual power generation amount, and then presetting to change the method of determining the load power to the method using the power generation capacity index after a predetermined time elapses. A measure that can be taken is considered to be changed also by an event considered to affect light reception on the light receiving surface of the solar panel 2a. Therefore, a method of returning the load power determination method may be set based on the installation location of the power generation facility 2, an assumed event that affects light reception on the light receiving surface of the solar panel 2a, and the like.

[Hardware Configuration]

Figure 4:
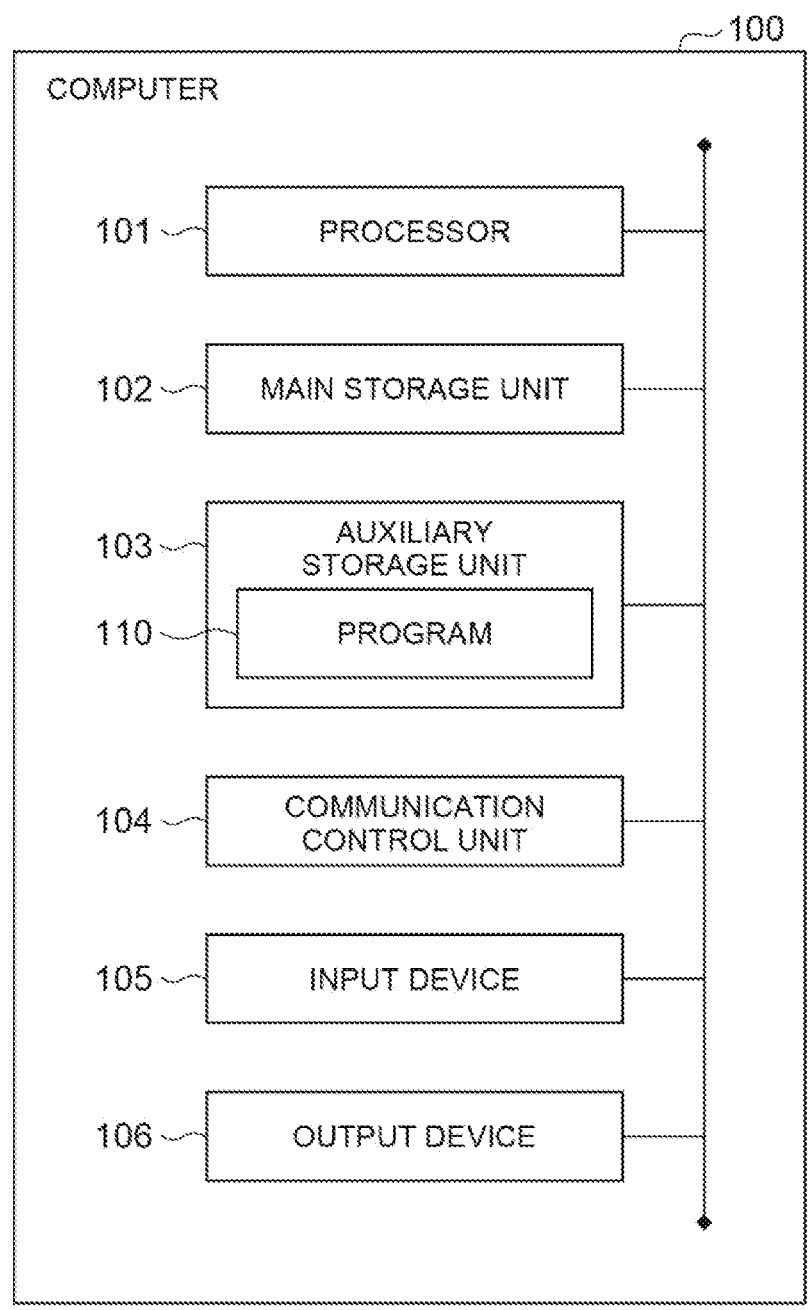
FIG. 4 is a diagram illustrating an example of a hardware configuration of an EMS.

A hardware configuration of the EMS 10 will be described with reference to FIG. 4. FIG. 4 is a diagram illustrating an example of the hardware configuration of the EMS 10. The EMS 10 includes one or a plurality of computers 100. The computer 100 includes a central processing unit (CPU) 101, a main storage unit 102, an auxiliary storage unit 103, a communication control unit 104, an input device 105, and an output device 106. The EMS 10 includes one or a plurality of computers 100 including the hardware and software such as a program.

In a case where the EMS 10 includes a plurality of computers 100, these computers 100 may be locally connected or may be connected via a communication network such as Internet or an intranet. With this connection, one EMS 10 is logically constructed.

The CPU 101 executes an operating system, an application program, and the like. The main storage unit 102 includes a read only memory (ROM) and a random access memory (RAM). The auxiliary storage unit 103 is a storage medium including a hard disk, a flash memory, and the like. The auxiliary storage unit 103 generally stores a larger amount of data than the main storage unit 102. At least a part of each unit constituting the EMS 10 is realized by the auxiliary storage unit 103. The communication control unit 104 includes a network card or a wireless communication module. At least a part of each unit constituting the EMS 10 may be realized by the communication control unit 104. The input device 105 includes a keyboard, a mouse, a touch panel, a voice input microphone, and the like. The output device 106 includes a display, a printer, and the like. For example, the EMS 10 may display command contents and the like from the control content command unit 17 on a display or the like.

The auxiliary storage unit 103 stores the program 110 and data necessary for processing in advance. The program 110 causes the computer 100 to execute each functional element of the EMS 10. For example, the processing related to steps S01 to S06 described above is executed in the computer 100 by the program 110. For example, the program 110 is read by the CPU 101 or the main storage unit 102, and operates at least one of the CPU 101, the main storage unit 102, the auxiliary storage unit 103, the communication control unit 104, the input device 105, and the output device 106. For example, the program 110 reads and writes data in the main storage unit 102 and the auxiliary storage unit 103.

The program 110 may be provided after being recorded on a tangible recording medium such as a CD-ROM, a DVD-ROM, or a semiconductor memory, for example. The program 110 may be provided as a data signal via a communication network.

Note that the program 110 is specifically a power management program for causing a computer to execute adjusting load power consumed by the load device 3 connected to the power generation facility including the photovoltaic power generation device, and causes the computer to execute controlling the load power based on the predicted generated power assuming that the generated power by the power generation facility 2 is the predicted generated power based on the power generation capacity of the power generation facility, and acquiring the actual generated power generated by the power generation facility 2. At this time, in the control, when it is detected that the difference between the predicted generated power and the actual generated power is larger than a predetermined value, the generated power by the power generation facility serving as a reference in the control of the load power is temporarily changed from the predicted generated power to the actual generated power.

[Operation]

According to the power management system (EMS 10), the power management method, and the power management program, when it is detected that the difference between the predicted generated power and the actual generated power is larger than a predetermined value, the control unit 14 temporarily changes the control method for the power generation facility 2. Therefore, when the actual generated power generated by the power generation facility 2 deviates from the predicted generated power, it is possible to prevent the control in which the generated power by the power generation facility 2 is assumed to be the predicted generated power from being continued.

In addition, as a temporary change of the method of controlling the power generation facility 2, the control unit 14 changes the generated power by the power generation facility 2 serving as a reference in the control of the load power consumed by the load device 3 connected to the power generation facility 2 from the predicted generated power to the actual generated power. Therefore, when the actual generated power generated by the power generation facility 2 deviates from the predicted generated power, it is possible to prevent the control in which the generated power by the power generation facility 2 is assumed to be the predicted generated power from being continued. That is, when the actual generated power in the power generation facility fluctuates from that of the assumed state, it is possible to perform power management in consideration of the fluctuation.

In addition, the control in a state where the predicted generated power is changed to the actual generated power is configured to be temporary. With such a configuration, it is possible to prevent occurrence of a problem due to long-term continuation of the control of the load power based on the actual generated power. The EMS 10 designed on the premise of calculating the load power based on the predicted generated power may include control using a difference between the predicted generated power and the actual generated power. Therefore, if the load power is calculated using the actual generated power for a long period of time, control using the difference between the predicted generated power and the actual generated power assumed during the normal operation cannot be performed, and thus an unexpected problem may occur. On the other hand, by temporarily performing the control related to the calculation of the load power based on the actual generated power, the occurrence of the above-described event is avoided.

In addition, when the control unit 14 of the EMS 10 detects that the difference is larger than the predetermined value and does not perform the operation causing the difference to be large in the power generation facility 2, the generated power by the power generation facility 2 serving as a reference in the control of the load power may be changed from the predicted generated power to the actual generated power. As a cause of an increase in the difference between the predicted generated power and the actual generated power, there may be a case where a control operation in a range of a normal operation such as forced stop of some facilities for the purpose of adjustment of the generated power or the like is caused instead of some change in the power generation capacity of the power generation facility 2. Specifically, a forced stop or the like for preventing the reverse power flow described in the above embodiment is assumed. On the other hand, as described above, it is possible to prevent the change triggered by the generation of the difference derived from the normal operation, for example, by confirming that the operation causing the increase in the difference between the predicted generated power and the actual generated power is not performed in the power generation facility 2 and then changing the control to the control in which the actual generated power is the generated power by the power generation facility 2.

In addition, in a case where the control unit 14 of the EMS 10 detects that the difference is larger than the predetermined value and in a case where an event that causes the actual generated power to decrease occurs, the generated power by the power generation facility 2 that is a reference in the control of the load power may be changed from the predicted generated power to the actual generated power. Another event such as a failure in a power generation facility or a peripheral device thereof may be a cause of an increase in the difference between the predicted generated power and the actual generated power. In such a case, if the generated power by the power generation facility 2 serving as a reference in the control of the load power is changed from the predicted generated power to the actual generated power, it may be difficult to find at an early stage that a failure has occurred or the like. Therefore, as described above, it is possible to prevent the change triggered by the occurrence of the abnormality derived from the failure or the like, for example, by confirming that the event causing the decrease of the actual generated power occurs in the power generation facility 2 and then changing the control to the control in which the actual generated power is used as the generated power by the power generation facility.

In order to realize the above configuration, a panel monitoring unit 22 as a detection unit that detects the presence or absence of an obstacle with respect to the light receiving surface of the solar panel 2a included in the photovoltaic power generation device may be further included. In addition, when the panel monitoring unit 22 as a detection unit detects an obstacle to the light receiving surface, the control unit 14 may determine that an event causing the actual generated power to decrease has occurred. With the above configuration, the control unit 14 can reliably determine the event occurring in the photovoltaic power generation device. In addition, on the basis of this result, the control unit 14 can appropriately make a temporary change to the control based on the actual generated power.

In addition, when the difference is smaller than the predetermined value, the control unit 14 of the EMS 10 may change the generated power by the power generation facility 2 serving as a reference in the control of the load power from the actual generated power to the predicted generated power. With such a configuration, when the control based on the actual generated power becomes unnecessary, it is possible to quickly return to the control based on the predicted generated power.

In addition, when the difference is expected to be small, the control unit 14 of the EMS 10 may change the generated power by the power generation facility 2 serving as a reference in the control of the load power from the actual generated power to the predicted generated power. With such a configuration, when the control based on the actual generated power becomes unnecessary, it is possible to quickly return to the control based on the predicted generated power.

[Modified Example]

As described above, the present disclosure is not necessarily limited to the above-described embodiments, and various modifications can be made without departing from the gist of the present disclosure.

For example, the order of each determination (S01 to S04) illustrated in the flow for determining the change of the load power calculation method described in the above embodiment (FIG. 3) may be changed. Determination other than determination as to whether the difference is equal to or larger than the threshold (S01) may be omitted. Depending on the configuration of the microgrid 1 and the operation logic during normal operation by the EMS 10, it is assumed that there is no need to make each determination. Therefore, the determination content may be appropriately changed in consideration of the driving environment and the like.

In addition, in the above embodiment, the case where the power generation capacity index acquisition unit 11 acquires the power generation capacity index (predicted generated power assuming that all the PCSs 2*b* are in operation) from the power generation capacity index calculation unit 21 has been described. However, the predicted generated power may be calculated by the EMS 10.

[Others]

The present disclosure can contribute to the spread and expansion of renewable energy. Thus, the present disclosure can contribute to, for example, Goal 7 "Ensure access to affordable, reliable, sustainable and modern energy for all" of the sustainable development goal (SDGs).

[Supplementary Note]

The present disclosure includes the following configurations.

[1]

A power management system that controls a power generation facility including a photovoltaic power generation device, the power management system including:

- a control unit that controls the power generation facility on the basis of a predicted generated power, assuming that the generated power by the power generation facility is the predicted generated power based on a power generation capacity of the power generation facility, and
- a power generation information acquisition unit that acquires an actual generated power generated by the power generation facility,
- in which the control unit temporarily changes the method of controlling the power generation facility, when detecting that a difference between the predicted generated power and the actual generated power is larger than a predetermined value.

[2]

The power management system according to [1], in which the control unit temporarily changes generated power by the power generation facility as a reference in control of load power consumed by a load device connected to the power generation facility from the predicted generated power to the actual generated power, when the control unit detects that the difference is larger than a predetermined value.

[3]

The power management system according to [2], in which the control unit changes generated power by the power generation facility serving as a reference in the control of the load power from the actual generated power to the predicted generated power, when the difference becomes smaller than a predetermined value.

[4]

The power management system according to [2], in which the control unit changes generated power by the power generation facility serving as a reference in the control of the load power from the actual generated power to the predicted generated power, when the difference is expected to be small.

[5]

The power management system according to any one of [1] to [4], in which the control unit temporarily changes the generated power by the power generation facility serving as a reference in control of load power consumed by a load device connected to the power generation facility from the predicted generated power to the actual generated power, when detecting that the difference is larger than a predetermined value and when not performing an operation causing the difference to be large in the power generation facility.

[6]

The power management system according to any one of [1] to [5], in which the control unit temporarily changes the generated power by the power generation facility serving as a reference in control of the load power consumed by the load device connected to the power generation facility from the predicted generated power to the actual generated power in a case where it is detected that the difference is larger than a predetermined value and an event that causes the actual generated power to decrease occurs.

[7]

The power management system according to [6], further including a detection unit that detects presence or absence of an obstacle on a light receiving surface of a solar panel included in the photovoltaic power generation device, in which the control unit determines that an event causing the actual generated power to decrease has occurred when the detection unit detects an obstacle to the light receiving surface.

[8]

A power management method for controlling a power generation facility including a photovoltaic power generation device, the power management method including:

- controlling the power generation facility on the basis of a predicted generated power assuming that the generated power by the power generation facility is the predicted generated power based on a power generation capacity of the power generation facility; and acquiring actual generated power generated by the power generation facility, in which in the controlling, when it is detected that a difference between the predicted generated power and the actual generated power is larger than a predetermined value, a method of controlling the power generation facility is temporarily changed.

[9]

A power management program for causing a computer to control a power generation facility including a photovoltaic power generation device, the power management program causing the computer to execute:

controlling the power generation facility on the basis of a predicted generated power assuming that the generated power by the power generation facility is the predicted generated power based on a power generation capacity of the power generation facility; and acquiring actual generated power generated by the power generation facility, in which in the controlling, when it is detected that a difference between the predicted generated power and the actual generated power is larger than a predetermined value, a method of controlling the power generation facility is temporarily changed.

REFERENCE SIGNS LIST

1 Microgrid
2 Power generation facility
2a Solar panel
2b PCS
3 Load device
4 Power storage device
5 Power adjustment device
6 Power transmission grid
10 Power management system (EMS)
11 Power generation capacity index acquisition unit
12 Actual power generation amount information acquisition unit (Power generation information acquisition unit)
13 Related information acquisition unit
14 Control unit
15 Control information holding unit
16 Control content determination unit
17 Control content command unit
21 Power generation capacity index calculation unit
22 Panel monitoring unit (Detection unit)
23 Actual power generation amount measurement unit
90 Power system
100 Computer

The invention claimed is:

1. A power management system that controls a power generation facility including a photovoltaic power generation device, the power management system comprising:

a control unit that controls the power generation facility on the basis of a predicted generated power, assuming that generated power by the power generation facility is the predicted generated power based on a power generation capacity of the power generation facility, and a power generation information acquisition unit that acquires an actual generated power generated by the power generation facility, wherein the control unit temporarily changes a method of controlling the power generation facility, when detecting that a difference between the predicted generated power and the actual generated power is larger than a predetermined value.

2. The power management system according to claim 1, wherein the control unit temporarily changes the generated power by the power generation facility serving as a reference in control of load power consumed by a load device connected to the power generation facility from the predicted generated power to the actual generated power, when the control unit detects that the difference is larger than the predetermined value.

3. The power management system according to claim 2, wherein the control unit changes the generated power by the power generation facility serving as the reference in the control of the load power from the actual generated power to the predicted generated power, when the difference becomes smaller than the predetermined value.

4. The power management system according to claim 2, wherein the control unit changes the generated power by the power generation facility serving as the reference in the control of the load power from the actual generated power to the predicted generated power, when the difference is expected to be small.

5. The power management system according to claim 1, wherein the control unit temporarily changes the generated power by the power generation facility serving as a reference in control of load power consumed by a load device connected to the power generation facility from the predicted generated power to the actual generated power, when detecting that the difference is larger than the predetermined value and when not performing an operation causing the difference to be larger in the power generation facility.

6. The power management system according to claim 1, wherein the control unit temporarily changes the generated power by the power generation facility serving as a reference in control of load power consumed by a load device connected to the power generation facility from the predicted generated power to the actual generated power in a case where it is detected that the difference is larger than the predetermined value and an event that causes the actual generated power to decrease occurs.

7. The power management system according to claim 6, further comprising a detection unit that detects presence or absence of an obstacle on a light receiving surface of a solar panel included in the photovoltaic power generation device, wherein the control unit determines that an event causing the actual generated power to decrease has occurred when the detection unit detects an obstacle to the light receiving surface.

8. A power management method for controlling a power generation facility including a photovoltaic power generation device, the power management method comprising:

controlling the power generation facility on the basis of a predicted generated power assuming that generated power by the power generation facility is the predicted generated power based on a power generation capacity of the power generation facility; and acquiring an actual generated power generated by the power generation facility, wherein in the controlling, when it is detected that a difference between the predicted generated power and the actual generated power is larger than a predetermined value, a method of controlling the power generation facility is temporarily changed.

* * * * *